United States Patent [19]

Ronnen

[11] Patent Number: 5,699,403
[45] Date of Patent: Dec. 16, 1997

[54] NETWORK VULNERABILITY MANAGEMENT APPARATUS AND METHOD

[75] Inventor: U. George Ronnen, Ocean, N.J.

[73] Assignee: Lucent Technologies Inc., Murray Hill, N.J.

[21] Appl. No.: 420,917

[22] Filed: Apr. 12, 1995

[51] Int. Cl.$^6$ .............. H04J 1/16; H04M 1/24; G06F 11/00; G06F 13/00

[52] U.S. Cl. .............. 379/32; 379/5; 379/10; 379/15; 395/183.01; 395/185.01; 370/13; 364/550

[58] Field of Search .............. 370/13, 14, 17, 370/68; 379/1, 10, 11, 12, 13, 14, 15, 16, 17, 18, 19, 20, 220, 221, 222; 395/183.01, 183.06, 183.22, 185.01, 185.02; 364/550, 554, 570, 571.04; 455/67.1, 67.3, 67.9, 226.1

[56] References Cited

U.S. PATENT DOCUMENTS

| | | | |
|---|---|---|---|
| 4,290,851 | 9/1981 | Ball et al. | 364/504 |
| 4,750,175 | 6/1988 | Brenneman et al. | 370/13 |
| 5,253,184 | 10/1993 | Kleinschnitz | 364/550 |
| 5,309,448 | 5/1994 | Bouloutas et al. | 370/13 |
| 5,392,328 | 2/1995 | Schmidt et al. | 379/10 |
| 5,473,596 | 12/1995 | Garafola et al. | 370/13 |
| 5,561,760 | 10/1996 | Ferris et al. | 395/183.01 |

OTHER PUBLICATIONS

Presentation: "Dynamic Assessment Of Network Status And Vulnerability", Gregory D. Wyss, *Sandia National Labs*, Mar. 26, 1993, pp. 1–9.

Presentation: "Risk And Reliability Technology To Support The Telecommunications Industry", Allen L. Camp, *Sandia National Labs*, Mar. 26, 1993.

"What Every Engineer Should Know About Reliability And Risk Analysis", M. Modarres, *Marcel Dekker, Inc.*, 1993, pp. 297–329.

"Total Network Surveillance (TNS) Generic 1", *AT&T Network Systems*, 1991.

"Safety Monitor Software Real–Time Plant Risk Calculation", *ONUS*.

Computer program entitled "Sable".
Computer program entitled "Seatree".

*Primary Examiner*—Curtis Kuntz
*Assistant Examiner*—Binh K. Tieu

[57] ABSTRACT

A data processing system is provided for identifying risks associated with abnormal conditions of network elements in a communications network. A data collection and processing module collects alarm message signals from a communications network and processes the alarm messages to general abnormal condition signals. An interface module also receives external condition signals indicative of external conditions affecting network elements in the communications network. The system provides an electronic risk processing module that generates direct and indirect risk signals based upon the abnormal condition signals, the external condition signals, and stored reference data. A display means displays a network element risk signal which is the sum of said direct and indirect risk signals. The displayed risk signal aids in assessing risks associated with network elements experiencing abnormal conditions. The system also generates and displays a sub-network risk signal. The system also adjusts the various risk calculations to take into account different types of planned maintenance activities.

26 Claims, 9 Drawing Sheets

NETWORK VULNERABILITY MANAGEMENT APPARATUS AND METHOD

This invention was made with Government support under DE-FI04-93AL97012. The Government has certain rights in this invention.

FIELD OF THE INVENTION

The present invention relates to a system for risk based network vulnerability management. In particular, the invention provides users with real-time quantitative data about the potential impact of network element and overall network failures.

BACKGROUND OF THE INVENTION

Many telephone companies currently use the Total Network Management (TNM) system developed by AT&T for the overall surveillance of large telephone networks. The TNM system has a feature package called Network Vulnerability Alert which alerts users to potential vulnerability in the network when there are multiple similar abnormal events in the same geographic area. This feature does not, however, provide any quantitative indication of the vulnerability (i.e., risk) level.

Technicians presently set maintenance priorities based on a set of alarm messages generated by network elements (i.e., switches, links, STPs, etc.) and Operations Support systems. Alarms are generated whenever predetermined abnormal conditions are detected. Each alarm has an attribute called "Severity" that indicates whether the alarm condition is informational, minor, major or critical. Severity attributes are typically assigned by the manufacturer of the network element (e.g., AT&T, Northern Telecom, etc.) and are based on considerations that involve that particular network element alone.

This state of the art has a number of limitations. For example, there is no distinction among alarms with the same severity from a network perspective. Typically, technicians address various abnormal conditions based on their severity attributes without necessarily taking into account the risk that such a condition could lead to a service affecting failure. Unfortunately, such an approach often leads to the situation in which technicians address problems presenting lower failure risks than those posed by other prevailing abnormal conditions. In the case of the June-July 1991 network breakdown in the Washington, D.C. area, technicians had difficulties in assessing the evolving chain of events, with respect to the escalating risk of a complete network breakdown. They saw the severity of each successive abnormal event (alarm) but had no easy way to see which assets (i.e., network elements) were "single points of failure" whose loss would cause a complete network breakdown.

SUMMARY OF THE INVENTION

In accordance with the invention, a system and method are provided for identifying risks associated with abnormal conditions of network elements in a communications network. In particular, a data collection and processing module collects alarm message signals from a communications network and processes the alarm messages to generate abnormal condition signals. An interface module also receives external condition signals indicating external conditions that are affecting network elements in the communications network. Such external conditions include utility power alerts, weather alerts, and on-going maintenance. The risk identifying system provides an electronic risk processing module for generating direct and indirect risk signals based on the abnormal condition signals, the external condition signals, and stored reference data. The direct risk signal takes into account the impact of a network element failure and the likelihood of such a failure due to network conditions. The indirect risk signal represents the contribution of the abnormal condition of a network element to the failure risk of the sub-network(s) to which the network element belongs. The system displays a network element risk signal, combining direct and indirect risk, to aid in assessing risks associated with network elements experiencing abnormal conditions. The system also computes and displays a sub-network risk signal based on cut-sets and failure impact data associated with a sub-network of the communications network. The system also adjusts the various risk calculations to take into account different types of planned maintenance activities, to determine how the network would respond to such activities.

DESCRIPTION OF THE DRAWINGS

The invention will be described in greater detail below with reference to the attached drawings, of which.

DESCRIPTION OF THE PREFERRED EMBODIMENT

Figure 1:
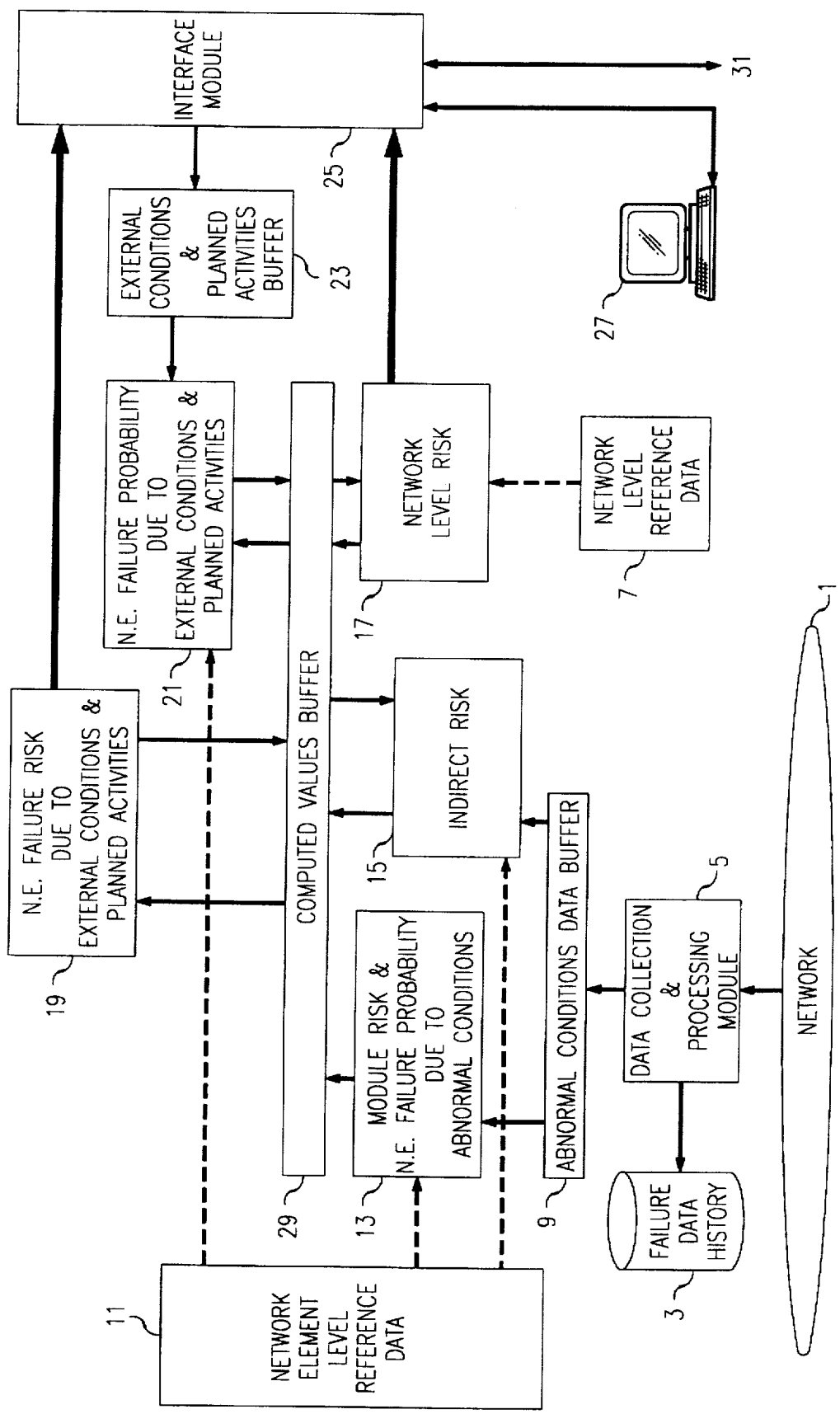
FIG. 1 is a diagram of the on-line subsystem modules.

Risk is defined as the product of the probability that an event will occur and the impact of such an event. The computation of failure risk is done on two levels: the network element level and the network level. At the network element level, the risk is derived from the computation of probabilities that the network elements (switches, links, databases, etc.) will fail and the computation of the impacts of such failures. At the network level, risks relate to network failures that are defined as the loss of the networks' ability to provide their intended functions (e.g., the loss of the ability to communicate between all points).

In the preferred embodiment, the present invention is implemented in two subsystems: an on-line subsystem and an off-line subsystem. The on-line subsystem is preferably implemented as an "application module" of the Total Network Management (TNM) Operations Support system (OS). TNM is being used by major telephone companies in the U.S. and abroad to automate and integrate network surveillance and control functions. The off-line subsystem is preferably implemented in software and is used to update reference data in "batch mode" on any large capacity computer complex.

The TNM hardware configuration consists of fault tolerant AT&T StarServer® FT computers utilizing Ethernet® and the AT&T Datakit® II Virtual Circuit Switch (VCS) for Local Area Network (LAN) and Wide Area Network (WAN) connectivity. The hardware configuration can include up to eight StarServer FT computers depending on the capacity requirements of the specific application.

TNM provides color graphics displays on workstations and X-Terminals. Ethernet provides communication between the StarServer FT and the workstations/terminals and inter-computer communication. Character based workstations and printers are networked with a TNM complex via Datakit II VCS providing easy access from geographically diverse locations.

The TNM software is implemented through a layered, platform-based architecture using the UNIX® operating system. The top layer consists of application modules that address specific operational needs of the telephone company users. Examples of such modules include: the TNM Integrator module that integrates data collected from the whole telephone network and displays it in a common format based on user defined criteria such as location or technology, the Event Correlation module that correlates multiple alarm messages related to the same root cause, and the 5XPRESS™ Switch Maintenance System that is an expert maintenance system for the AT&T 5ESS™ switch.

The middle layer consists of the Common Communications Backplane which is the software equivalent of a bulletin board. Communications among modules connected to the backplane (e.g., the platform modules and the application modules) are initiated when the requesting software entity posts a request on the backplane. The backplane then identifies the addressed entity and passes the request to it. The addressed entity generates the requested data and posts it in turn on the bulletin board, which recognizes and returns the results to the originating module. For example, if an application module requests data from a database, the platform will recognize the bulletin board request and transfer it to the database management system. The data retrieved from the database is then posted to the bulletin board (by the database management system), and returned through the backplane to the requesting application module. Another benefit of the platform is that a new module can be added to the system by "plugging" a new module into the software backplane without affecting any other application module.

The lowest layer is the TNM Platform, which includes the support features that are common to multiple application modules. TNM Platform features include data collection, output messages tools, security, operations systems interface, scheduling, performance measurements, user interface, standards compliance, open programming and more. The TNM Platform provides the following major services.

Data Collection and Distribution: This includes communicating with data-sources such as network elements and other OSs, collecting data from these sources, logging the data, browsing the data, filtering the data, and distributing (via the backplane) the data to other functions when requested.

Database Capabilities: The platform maintains the TNM database and includes a notification subsystem which notifies registered software subsystems when data has changed.

Operations Systems InterFace (OSIF): This package supports the forwarding of messages received and processed by TNM to other OSs.

General Purpose Software Tools: This package includes a Man Machine Language (MML) based command line user interface, a permissions and security package, system administration and maintenance capabilities, and a scheduler.

FIG. 1 illustrates the modules of the on-line subsystem, which is used to continuously compute and display the risk information. The on-line subsystem has three main elements: the data collection and processing module 5, the risk computation modules 13–21, and the interface module 25.

The data collection and processing module 5 collects data from the communication network 1 about network element status (e.g., from autonomous alarm messages, reports, etc.). This function is similar to the existing TNM data collection capability. The module 5 checks whether the reported events have exceeded pre-defined time and, when applicable, rate and value thresholds. This function is similar to the three existing TNM thresholding capabilities: time thresholding of abnormal events (i.e., whether they have been active for more than the predefined threshold duration); rate thresholding of abnormal events (i.e., whether there have been more than the predefined instances of abnormal occurrences followed by return to normal conditions—"oscillations"); and value thresholding (i.e., whether a particular value, such as a count, reported by the network element has exceeded predefined magnitudes). The module 5 then uses a look-up table or similar approach to associate each collected data item with the relevant functional module of the network element. The module 5 is also computing (using a table look-up or similar method), a severity value based on the severity attribute of the abnormal condition (e.g., major) and the time threshold level that was exceeded. For example, when the severity attribute of the abnormal condition is "major" and the duration of the alarm is less than the first time threshold value then the module 5 will compute one severity value. However, if the duration of the same abnormal condition (i.e., with the same severity attribute), exceeds the value set for the first time threshold, then the module 5 will compute a higher severity value. The data is converted into a common format to ensure that the inputs to the computational sub-modules are in a consistent format. Selected failure data, based on predefined filters, is stored in a failure data history database 3. This is similar to the TNM data logging capability. Module 5 is preferably implemented using many of the TNM Platform features.

Module 5 is executed on an event oriented basis when there is a change of input status, or when the duration of an alarm condition exceeds a new time threshold value. For example, if the time threshold for an alarm is ten minutes, then, if the alarm is still active when the associated timer reaches the ten minutes count, the module 5 will be executed again, to compute a new severity value. The outputs generated by this module are stored in the abnormal conditions data buffer 9. The buffer 9 includes data about new alarms that were created in the latest computation period and about alarms whose status has changed (e.g., changed in severity value, cleared, etc.).

Risks are computed in the modules 13–21 based on alarm-related data from the abnormal conditions data buffer 9, inputs from the interface module 25 via the external conditions and planned activities buffer 23, and reference data from data modules 7 and 11 computed in the off-line subsystem. The values computed by these modules 13–21 are stored in the computed values buffer 29. Risk values are computed periodically, for example, every five minutes.

The interface module 25 accepts manual entries from the users 27 regarding external conditions such as weather alerts, utility power alerts, etc. The module 25 also interfaces to other related OSs 31 such as the Traffic Management and Work Scheduling systems (for traffic, planned activities, maturity status, etc.). The data received from external sources is processed and converted into the format needed by the risk computation modules 13-21. For example, the module 25 provides the identities of those network elements affected by a given external condition, the type of external condition, etc. Finally, the interface module 25 displays the computed risk information to users 27 and to other OSs 31.

The interface module 25 is invoked whenever there is a change in one of the inputs, such as an external condition, a change in a computed risk value, or when there is a new request for display of risk data. Data relating to changes in external conditions and planned activities is stored by the interface module 25 in the external conditions and planned activities buffer 23. Module 25 is preferably implemented using the TNM Integrator application module.

Figure 2:
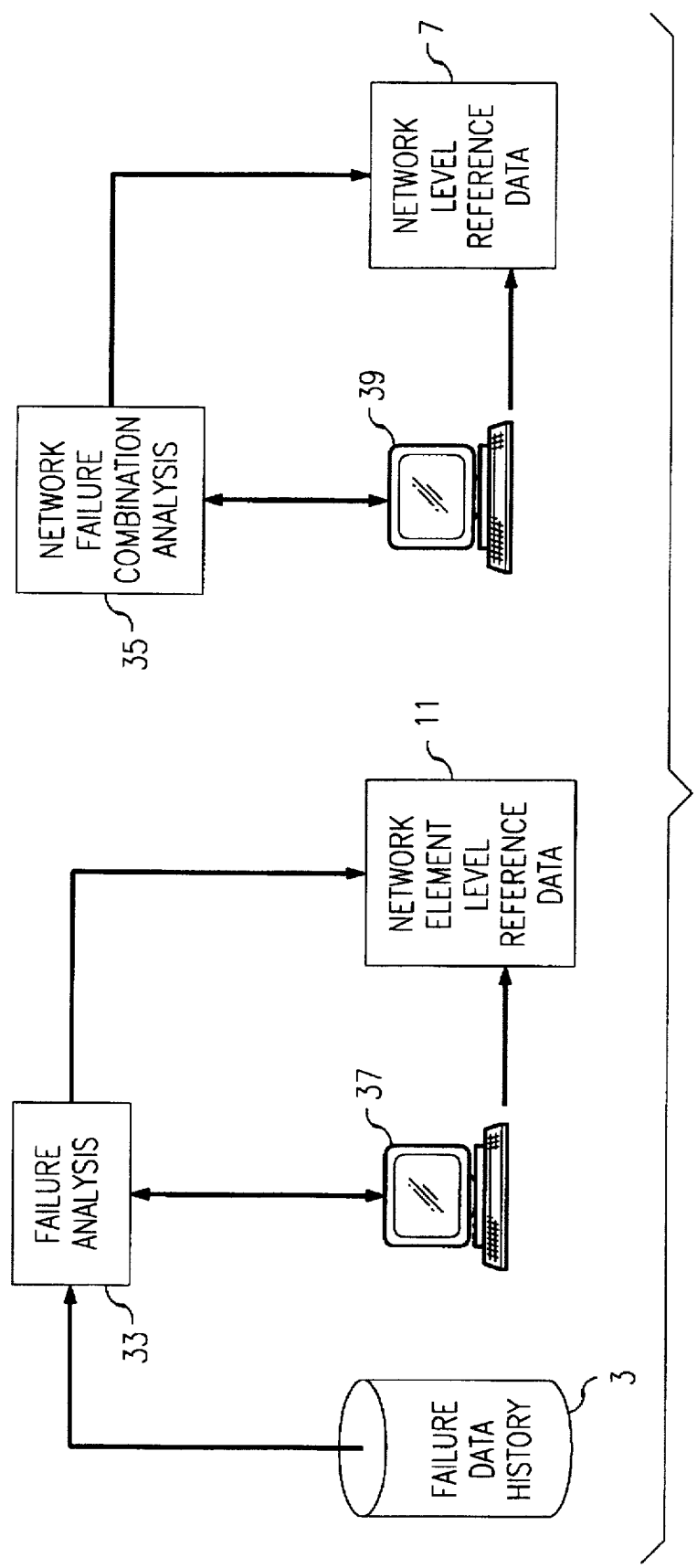
FIG. 2 is a diagram of the off-line subsystem modules.

The off-line subsystem is shown in FIG. 2. The purpose of the off-line subsystem is to compute the reference data needed by the on-line subsystem. These computations are executed periodically to update data about the network configuration and about the various network elements (e.g., module impact factors, new software/hardware, etc.). The off-line subsystem consists of two parts: one that deals with the network and one that deals with individual network elements.

Network level reference data is stored in data module 7 and consists of cut-set definitions, background failure probabilities, and sub-network failure (indirect) impact values. Cut-sets are computed by the network failure combination analysis module 35. Such computation is based on the prevailing configuration (connectivity) of the network and its failure definition. The module 35 performs a "fault tree" analysis and searches for all the minimized combinations of concurrent network element failures that would lead to a network breakdown. One example of a cut-set would be "A and B and D and F" where A, B, D and F represent network elements. Cut-set definitions are boolean equations that represent the minimized combinations of concurrent network element failures that would cause network failure.

Users 39 enter background failure probability values for each network element. Such values are defined to be the probability of failure due to causes that are not preceded by advance warnings such as alarm messages.

Users 39 also enter sub-network impact data. Such data provides a measure of the impact (cost) of the failure of the various sub-networks of the overall network for a pre-defined time period.

Data module 11 stores network element level reference data including failure probabilities, network element impact figures, module impact factors, module maturity factors, and congestion factors. Failure analysis module 33 computes conditional probabilities that specified abnormal conditions will escalate into service affecting events within a pre-defined time period. Such probabilities may be derived from the failure data history database 3 collected by the on-line subsystem, failure data provided by network element manufacturers, best estimates by subject matter experts, and published data (e.g., FCC and Bellcore reports).

Users 37 assign network element impact figures for the network elements based on criteria that reflect the relative "worth" of the network elements. These impact values are stored in data module 11. All probability and impact values entered by users into data module 7 and data module 11, are based on pre-defined duration of the events.

Network elements may be comprised of a plurality of functional modules. The term "functional module" is used for major components of the network element architecture such as the switch module (SM), administration module (AM), etc. of a 5ESS switch. Each functional module has two identical mates each being able to provide the full functionality of the module should the other fail. The failure of one of the mates is called a simplex failure and the failure of both mates is called a duplex failure. The complete (duplex) failure of a functional module leads directly to a loss of service, either partial or complete.

Users 37 specify module impact factors which quantify the relative contribution of the various functional modules within each network element. For example, with respect to switching modules of a 5ESS switch, such module impact factors represent the fraction of the total switch impact that would be affected if one of these modules failed.

Users 37 also specify module maturity factors which magnify network element failure probabilities depending on the maturity of network element software and hardware. Maturity factors may have one of four values corresponding to new software, new hardware; new software, mature hardware; mature software, new hardware; or mature software, mature hardware (the default with a factor equal to one).

Users 37 further specify congestion factors which are used to account for the increased failure probability of network elements that are both in abnormal conditions and traffic congestion states. There are a discrete set of traffic congestion levels each with a corresponding congestion factor.

Referring again to FIG. 1, the following is an overview of the risk computations occurring in the on-line subsystem. Module 13 computes network element risks and failure probabilities due to abnormal conditions in the network element of interest. These computations are repeated for each abnormal condition in the functional modules of the network element.

Module 21 computes various network element failure probabilities. These probabilities are due to external conditions, planned activities, and abnormal conditions as computed in module 13.

Module 15 computes the indirect risk of network element failures. Indirect risk is defined as the contribution of the abnormal condition of the network element, to the failure risk of the sub-network(s) to which the network element belongs. In general, indirect risks are associated with the network elements that are not directly connected to customers (e.g., 800 number conversion databases) and that are connected to the network as redundant elements, so that when one of them fails a redundant element assumes its functions.

Module 19 then computes the failure risk of the whole network element based on probability, impact, and risk values previously computed. These computations are repeated for each network element whose status has changed as reflected by data in the abnormal conditions data buffer 9 and the external conditions and planned activities buffer 23. The computed network element risk is sent to interface module 25 for display to users 27 and for transfer to other OSs 31.

Finally, the previously computed individual network element failure probabilities along with the network configuration are used by module 17 to compute the risks that sub-networks within the overall network will no longer able to provide the intended functions (services) such as the ability to send or receive voice or data from any other point in the network. These risk values are transferred to interface module 25 for display to users 27 and for transfer to other OSs 31.

The inputs to the risk computation modules 13-21 are processed on an event oriented basis by the data collection and processing module 5 and the interface module 25. These modules store in their respective buffers 9 and 23 data related to changes in network conditions, external conditions, planned activities, and other conditions that affect the probability of failure. The risk computations of modules 13–21 are executed periodically, for example, every five minutes.

The following is a detailed description of the computational logic needed to determine the real-time risks due to network conditions and planned activities. In particular, FIGS. 3–7 and associated text depict the tasks performed by the risk computation modules 13–21. Although the modules of the subsystems are preferably implemented programmatically, they may also be implemented by direct electrical connection through integrated circuits, or a combination of both, using any methods known in the industry for providing the functions described below without departing from the teachings of the invention.

The risk computation modules 13–21 include various submodules that retrieve the appropriate probability data, impact data, and multipliers from the reference data modules 7 and 11, for use in the risk calculations of the present invention. In general, the submodules consist mostly of table look-up processes. The submodules receive data inputs via messages 41, 53, and 85 from the buffers 9 and 23. Based on these inputs, the submodules mostly retrieve data from the corresponding data tables stored in the reference data modules 7 and 11.

Referring to FIG. 1, data regarding the status of network elements and the status of the overall network 1 are collected in real-time from the affected network elements via alarm messages. Such alarm messages may be generated by the network elements themselves, by the TNM thresholder (when the rate or duration of low level network element messages exceed pre-set threshold levels), or by the TNM based on data included in periodic reports and messages generated by network elements. This alarm data is processed by module 5, stored in buffer 9, and provided to the submodules via abnormal condition messages 41.

Figure 3:
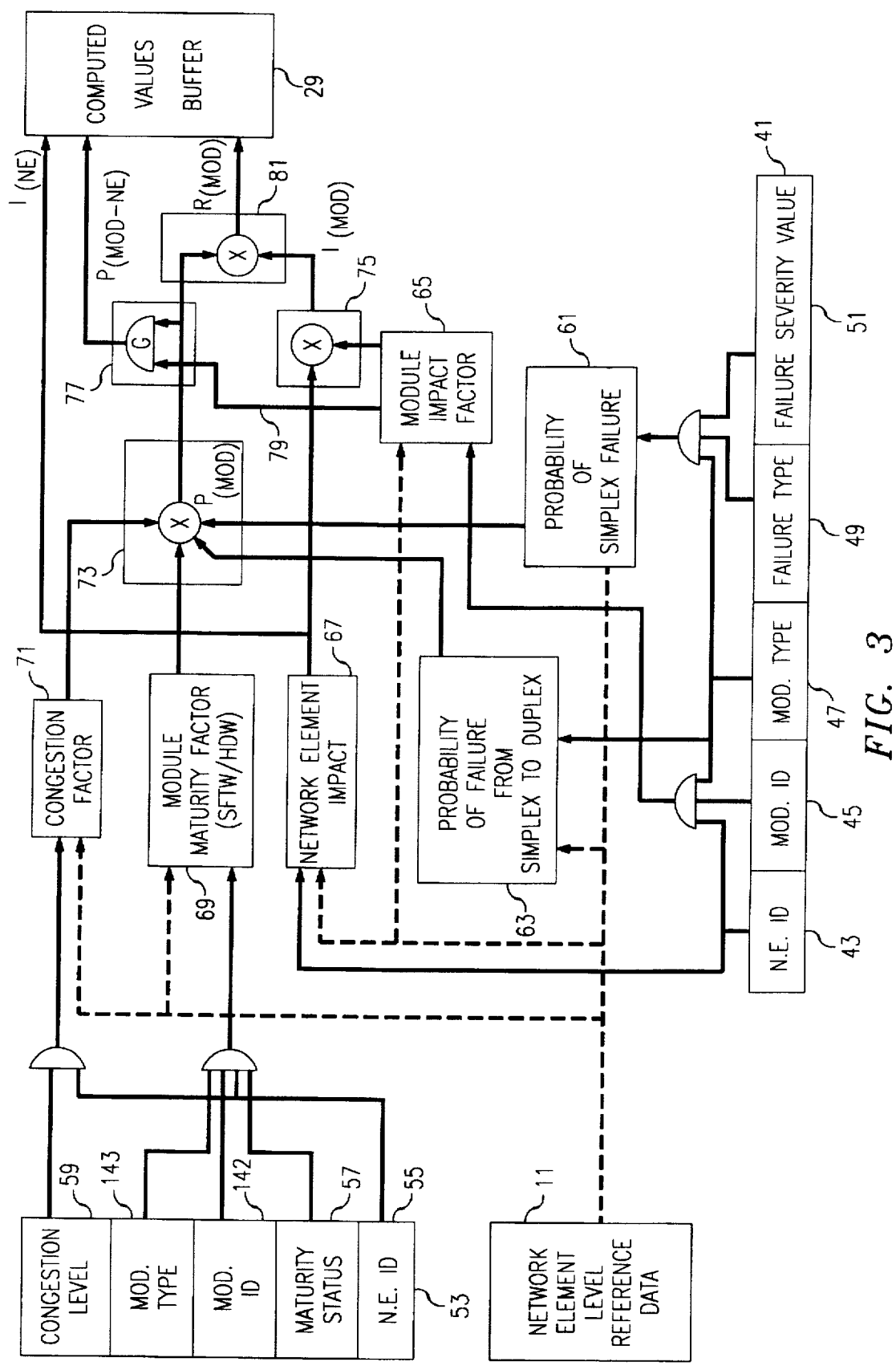
FIG. 3 is a diagram illustrating the submodules for determining network element risk due to abnormal conditions.

Abnormal condition messages 41, shown in FIG. 3, provide real-time data about abnormal conditions in the network elements. The messages 41 contain element-specific data in the following data fields: Network Element Identifier 43 (e.g., switch at Wall St.), Module Identifier 45 (e.g., #2), Module Type 47 (e.g., switch module), Failure Type 49 (e.g., overload), and Failure Severity value 51.

Referring again to FIG. 1, other real-time data indicating which network elements are affected by severe weather, utility power alerts, on-going maintenance, network congestion, etc. are provided from other OSs 31 and from manual entry via interface module 25. This data is stored in buffer 23 and provided to the risk computation submodules via messages 53 and 85. Message 53, shown in FIG. 3, has the following data fields: Network Element Identity 55, Maturity Status 57, Module Identifier 142, Module Type 143, and Congestion Level 59. Message 53 indicates whether a particular network element has new (immature) hardware or software in its functional modules, and whether it is experiencing a high congestion level.

Figure 4:
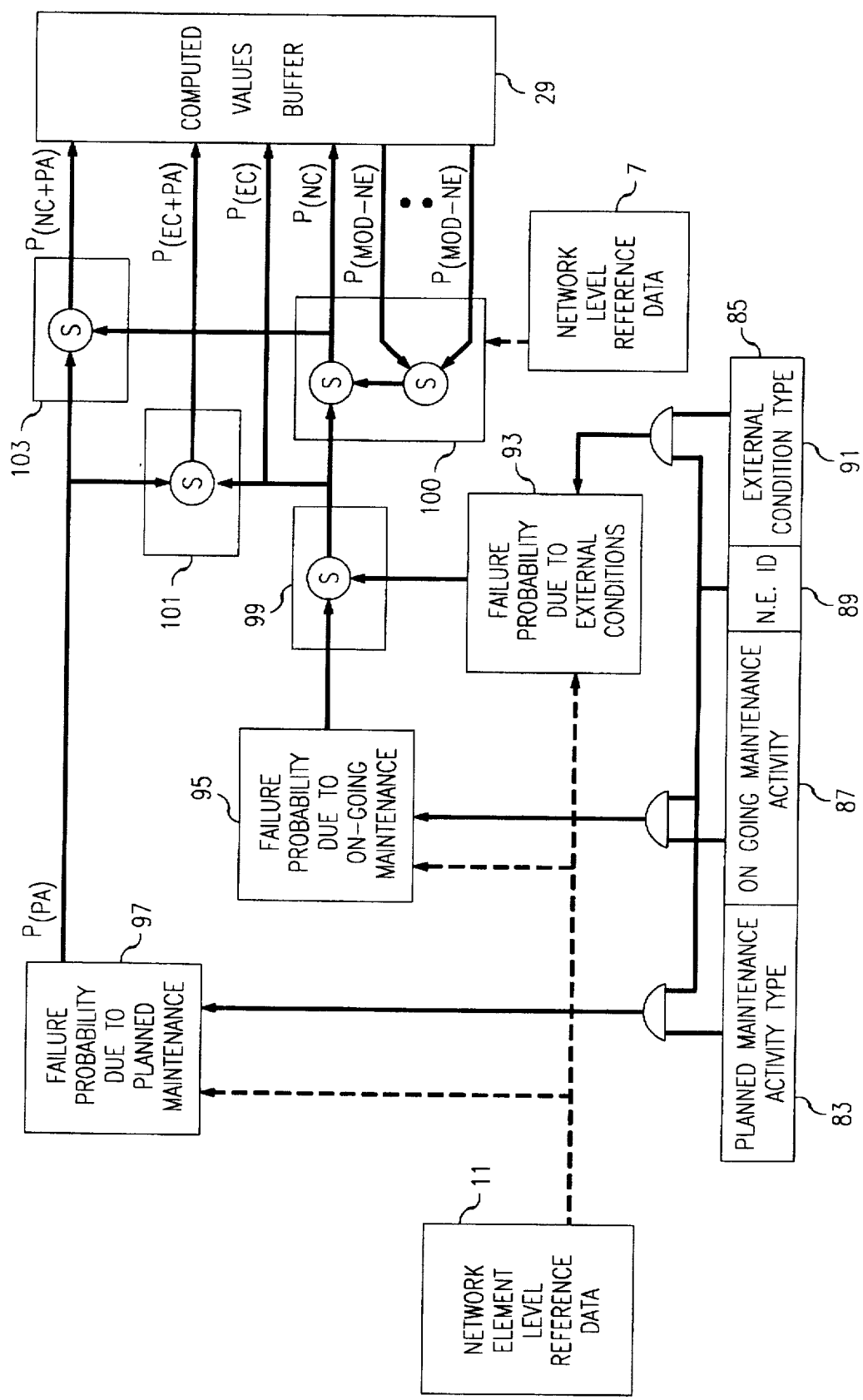
FIG. 4 is a diagram illustrating the submodules for determining network element failure probabilities.

Message 85, shown in FIG. 4, has the following data fields: Planned Maintenance Activity Type 83, On-going Maintenance Activity 87, External Condition Type 91, and Network Element Identifier 89. Message 85 indicates whether a particular network element is experiencing various external conditions, on-going maintenance, or a planned maintenance activity.

The computations performed by modules 13–21 are driven by the inputs from buffer 9 and buffer 23. If a change in a network element condition results in a message 41, then data from the buffer 23 corresponding to the same network element is caused to be sent to the submodules via messages 53 and 85. Similarly, when a change in external conditions or planned activities results in messages 53 or 85, then data from the buffer 9 corresponding to the same network element is caused to be sent to the sub-modules via message 41. Consequently, for any given set of calculations, the network element identified in fields 43, 55 and 89 will be the same.

FIG. 3 illustrates the method of computing network element risk and failure probability due to abnormal conditions as implemented by module 13. Submodule 61 retrieves the probability of simplex failure of a functional module from reference data module 11. A simplex failure occurs when one of two identical mates fails due to an abnormal condition.

Submodule 61 receives inputs from message 41 indicating the module type 47, failure type 49, and failure severity value 51 of the abnormal condition. This information is formatted and sent to reference data module 11 (as described above) to retrieve the probability data. Note that the retrieved probability value is also dependent on the duration of the alarm (through the failure severity value computed in module 5).

Data module 11 stores the conditional probabilities that a functional module having received an alarm message indicating a given abnormal condition, will experience a simplex failure due to that abnormal condition within a pre-defined time period called "abnormal condition restoration time". Such probability data is "technology specific" in that it is the same value for all network elements of the same type and from the same manufacturer. These probabilities may, for example, be derived from statistical data on failure histories or best estimates of subject matter experts. When the failure type is a duplex failure (meaning that both mates of the functional module are non-operational), the value retrieved by submodule 61 from data module 11 is equal to the value of one divided by the value that is retrieved by submodule 63 from data module 11. This ensures that for this special condition, the probability $P_{(MOD)}$ that is computed in submodule 73, is equal to one (the value that represents the certainty of an actual duplex failure condition).

Submodule 63 retrieves from data module 11 the probability that the mate functional module will fail when the other mate is not in operation, due to random electrical, hardware, software, etc. problems that are not preceded by alarms or other warnings, thereby resulting in a duplex failure of the functional module. This probability is also technology specific and is assumed, based on the design philosophy of full redundancy, to be dependent only on the module type and on a pre-defined time period called "simplex condition restoration time", and not the status of the mate, which may or may not be experiencing an alarm condition. Module type information 47 is supplied via input message 41 and used to retrieve the corresponding probability value from data module 11.

Submodule 69 retrieves a maturity factor from data module 11. Maturity factors are probability multipliers that account for the higher failure rates of newly installed software and/or hardware. Submodule 69 receives input message 53 indicating the maturity status 57 of a particular functional module that is identified by Network Element ID 55, Module ID 142, and Module Type 143. Maturity status data 57 indicates whether the functional modules of the network element have old hardware/old software, old hardware/new software, new hardware/old software, or new hardware/new software. Such data is used by submodule 69 to retrieve the corresponding maturity factor from data module 11.

Submodule 71 retrieves a congestion factor from data module 11. Congestion factors are probability multipliers that account for higher functional module failure rates when affected network elements are subjected to heavy call processing (traffic congestion). Network congestion data 59 and network element identity 55, from the Traffic Management OS, are provided to submodule 71 via message 53. Network congestion data 59 indicates the degree of network congestion, for example, on a scale of 1–10. In such a case, data module 11 would store ten congestion factors corresponding to the ten degrees of traffic congestion. Then, depending on congestion data 59, one of these congestion factors is retrieved by submodule 71.

The probability of functional module failure $P_{(MOD)}$ is computed at submodule 73 as the product of the probability of simplex failure, the probability of mate failure, the maturity factor, and the congestion factor. The probability $P_{(MOD)}$ is then limited to a maximum value of one to be in the range zero to one.

Submodule 65 retrieves a module impact factor from reference data module 11 based on inputs from message 41, namely, network element identity 43, functional module identity 45, and module type 47. Module impact factors represent the fraction of the total network element failure impact that will be affected if a specific functional module has a duplex failure. Module impact factors are in the range zero to one. A factor of one indicates that a duplex failure of the functional module will bring down the entire network element. A factor of one-half indicates that half the module is affected. For example, in the case of a specific switch module failure of a 5ESS switch, service is lost only to users that are connected to that switch module. If, however, there is a complete communication module failure, all customers serviced by that network element are affected. Impact factors are reviewed and adjusted periodically by the user to account for growth and for changes in the load distribution among specific functional modules (e.g., switch modules, digital interface units, etc.).

The output of gate 77 is the probability of network element failure due to module failure $P_{(MOD-NE)}$. If the module impact factor is equal to one, the probability of failure of the network element is equal to the probability of failure of the module of interest ($P_{(MOD)}$). If the module impact factor is less than one, the probability of failure of the network element due to the module of interest is assigned a zero value. Gate input 79 from submodule 65 to gate 77 is in the logical high state when the impact factor is one, and in the logical low state when the impact factor is any value less than one. Gate 77 thus transmits $P_{(MOD)}$ when gate input 79 is high, otherwise, gate 77 transmits a zero value. The output of gate 77 is sent to the computed values buffer 29.

Submodule 67 retrieves network element impact data $I_{(NE)}$ from module 11. $I_{(NE)}$ is output to computed values buffer 29 and multiplier 75. Such impact data quantifies the penalty (cost impact) due to a complete loss of service, for a pre-defined duration, of the network element identified by the input 43 to submodule 67. The network element impact value quantifies the cost to the network operator due to a complete loss of service from the network element. The value is dependent on the specific size and type of service provided by the network element. For example, the network element value may depend on the number of lines serviced, the yearly revenue, and special features such as whether the switch is servicing a vital facility (e.g., an airport). These cost impact values are defined by the system operator and represent the relative value of each network element. The simplest measure of the impact value is the cost of a two hour service loss, using the annual revenue from the network element as a baseline.

The output of multiplier 75 is the functional module failure impact $I_{(MOD)}$. The impact of a functional module failure is computed as the product of the direct impact of complete network element failure and the module impact factor, from submodules 67 and 65 respectively.

The output of multiplier 81 is the risk due to functional module failure $R_{(MOD)}$. The risk of functional module failure is computed as the product of $P_{(MOD)}$ and $I_{(MOD)}$, from submodule 73 and multiplier 75 respectively. The output of multiplier 81 is sent to the computed values buffer 29.

FIG. 4 illustrates the method for computing various network element failure probabilities as implemented by module 21. Submodule 93 retrieves the failure probability of the whole network element due to external conditions such as utility power alerts and severe weather alerts. Such probabilities may be derived from information available in the public domain (e.g., from FCC reports). It may be readily appreciated that the user can define and provide data for other types of external conditions affecting failure probability. Input message 85 supplies submodule 93 with the network element identity 89 and the type of external condition 91 it is experiencing. This information is used for retrieving the appropriate failure probability from data module 11.

Submodule 95 retrieves the failure probability of the whole network element due to procedural errors that could occur during routine maintenance. Such probabilities may also be based on statistical data available in the public domain (e.g., from FCC reports). Submodule 95 receives data relating to on-going maintenance activities 87 and the affected network element identity 89 via input message 85. This data is then used to retrieve the appropriate failure probability from data module 11.

Summer 99 adds the failure probabilities due to external conditions and on-going maintenance. The resulting probability is referred to as to the probability of network element failure due to external condition $P_{(EC)}$. The category "external conditions" hereinafter includes the condition of on-going maintenance affecting a network element, and is used to distinguish from those conditions accounted for in $P_{(MOD-NE)}$. The category "network conditions" includes both external conditions and those accounted for in $P_{(MOD-NE)}$.

Submodule 100 computes the probability of network element failure due to network conditions $P_{(NC)}$. $P_{(EC)}$ (from summer 99) is added to the sum of the probabilities of failure due to functional module failure $P_{(MOD-NE)}$ (from buffer 29) for all functional modules in the network element that are in abnormal condition (i.e., functional modules experiencing alarms). This takes into account the case when multiple functional modules in the same network element are in abnormal state and could cause a complete network element failure. Both $P_{(EC)}$ and $P_{(NC)}$ are sent to buffer 29. For network elements that are not in abnormal condition (and are therefore not identified in data fields 43, 55 and 89), submodule 100 sets their corresponding probability of network element failure due to network conditions $P_{(NC)}$ to be equal to their background probability values. This is done by retrieving these background probability values from the data module 7.

Submodule 97 allows system operators to simulate the network risks that would arise if certain planned activities were actually carried out. Submodule 97 retrieves the probability of failure of the whole network element that may occur during planned maintenance. Planned activities such as upgrades, routine maintenance, network growth, etc., increase the failure probability of the network element undergoing the planned activity. Probabilities of failure due to planned activities $P_{(PA)}$ are based on statistical data available in the public domain (e.g., from FCC reports) and best estimates by subject matter experts. Input message 85 provides planned maintenance activity type data 83 and the network element identity 89 to submodule 97. The planned activity type data indicates whether or not the planned maintenance activity will involve the removal from service of one of the mates of a functional module whose failure would cause a complete failure of the network element (i.e., that has a module impact factor equal to one). In the first case, the probability value retrieved by submodule 97 from data module 11 will reflect the likelihood of network element failure due to a simplex condition in one of its modules with impact factor equal to one and that of a procedural error. In the second case, the probability value will reflect only the likelihood of a network element failure due to a procedural error.

Summer 101 computes the combined failure probability of the whole network element due to external conditions and planned activities $P_{(EC+PA)}$. $P_{(PA)}$ is simply added to $P_{(EC)}$. This probability is used to compute and display "what if" conditions. The value $P_{(EC+PA)}$ is sent to buffer 29.

Summer 103 computes the combined failure probability of the whole network element due to network conditions and planned activities $P_{(EC+PA)}$. $P_{(PA)}$ is simply added to $P_{(NC)}$. The value $P_{(NC+PA)}$ is sent to buffer 29 and is also used to compute and display "what if" conditions.

The above-described probabilities have values ranging between zero and one. In general, the events whose probabilities are summed are not mutually exclusive. However, the probabilities of simultaneous occurrence of events are sufficiently small as to justify the indicated summations without subtracting out any probabilities of joint occurrence.

Figure 5A:
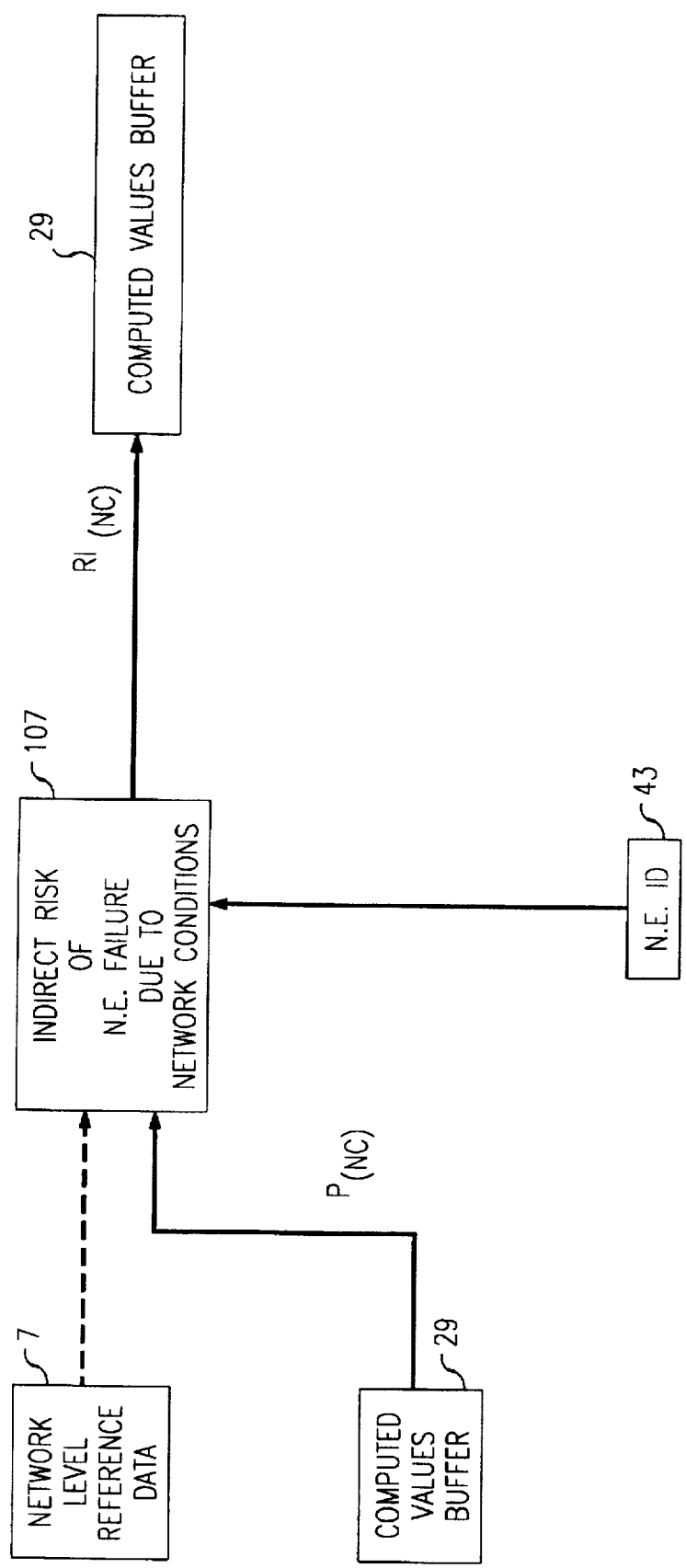
FIGS. 5A-5B are diagrams illustrating the submodules for determining indirect risk of network element failures due to network conditions and planned activities.

FIG. 5A illustrates the method of computing the indirect risk of network element failures as implemented by module 15. Submodule 107 determines the indirect risk $RI_{(NC)}$ of a network element failure. The indirect risk represents the network related element. It failure of the network element. It accounts for the effect on the integrity of the network should a particular network element fail completely. For example, if a network element represents the "last thread" that maintains the integrity of the network, any abnormal condition related to it will present a higher risk than when the related redundant network elements function properly.

The computation of indirect risk is based on the real-time failure probability values of those network elements that are included in cut-sets associated with the network element of interest. Cut-sets define the conditions when a specific sub-network, such as a LATA, will fail (e.g., will be disconnected from the overall network). Each group of cut-sets corresponding to a specific sub-network is associated with a value that represents the impact of the failure of this sub-network from the overall network. For example, if a group of cut-sets define the conditions under which a sub-network containing "800 number" databases would be isolated for a pre-defined duration then the associated cost is based on the loss of revenue due to the unavailability of this service.

Network level reference data is retrieved from data module 7 and used by submodule 107 in computing the indirect risk due to network conditions $RI_{(NC)}$. Such reference data includes a table that associates network elements whose failure has an indirect impact with the sub-networks to which they belong and a table that associates each sub-network with its impact value. The network element table does not have sub-network identifiers for network elements whose failure has only direct impact (such as end office switches). The reference data also includes a set of files (one file per sub-network), with the cut-set definitions associated with a sub-network. Finally, data modules 7 stores background failure probabilities that represent the likelihood of a failure not preceded by an alarm condition.

The computation of $RI_{(NC)}$ is now described. Submodule 107 uses the identity 43 of the network element of interest to select, from the table in data module 7, the sub-network(s) that include the network element of interest. If a network element is associated with several sub-networks, the table will include the identities of each of these sub-networks. If the network element of interest does not have an indirect impact, there is no sub-network associated with it in the table.

For each sub-network associated with the network element, the following computations are performed: Compute the value of the associated cut-sets in two ways. First, retrieve from buffer 29 the prevailing probability values $P_{(NC)}$ for all constituent network elements and use them to compute the cut-set values. Sum the resulting cut-set values. Second, retrieve the background failure probability for the network element of interest from data module 7. Then compute the cut-set values using this background probability along with the prevailing $P_{(NC)}$ values for all the other constituent network elements. Again, sum the resulting cut-set values. Next, subtract the two sums calculated above. This difference value represents the contribution of the network element's abnormal condition to the increased probability that the sub-network will fail (e.g., it will disconnect from the overall network). The difference value is then multiplied by the cost to the system operator should the sub-network fail. The result is a quantitative indicator of the change in sub-network risk due to the abnormal condition of a particular network element.

The above computations are performed for each sub-network associated with the network element of interest, and the resulting sub-network risks are summed together to arrive at the indirect risk $RI_{(NC)}$. The value $RI_{(NC)}$ is sent to buffer 29.

As an example of the above approach, the risk of a simplex STP condition will be much smaller when all other related STPs operate normally, than in the case when other STPs in the quad (which ensure the integrity of the network) are also in alarm conditions and thus more likely to fail. Similarly, the risk of an SS7 link failure will depend on the status of all other links in the link set and of the two associated STPs.

Figure 5B:
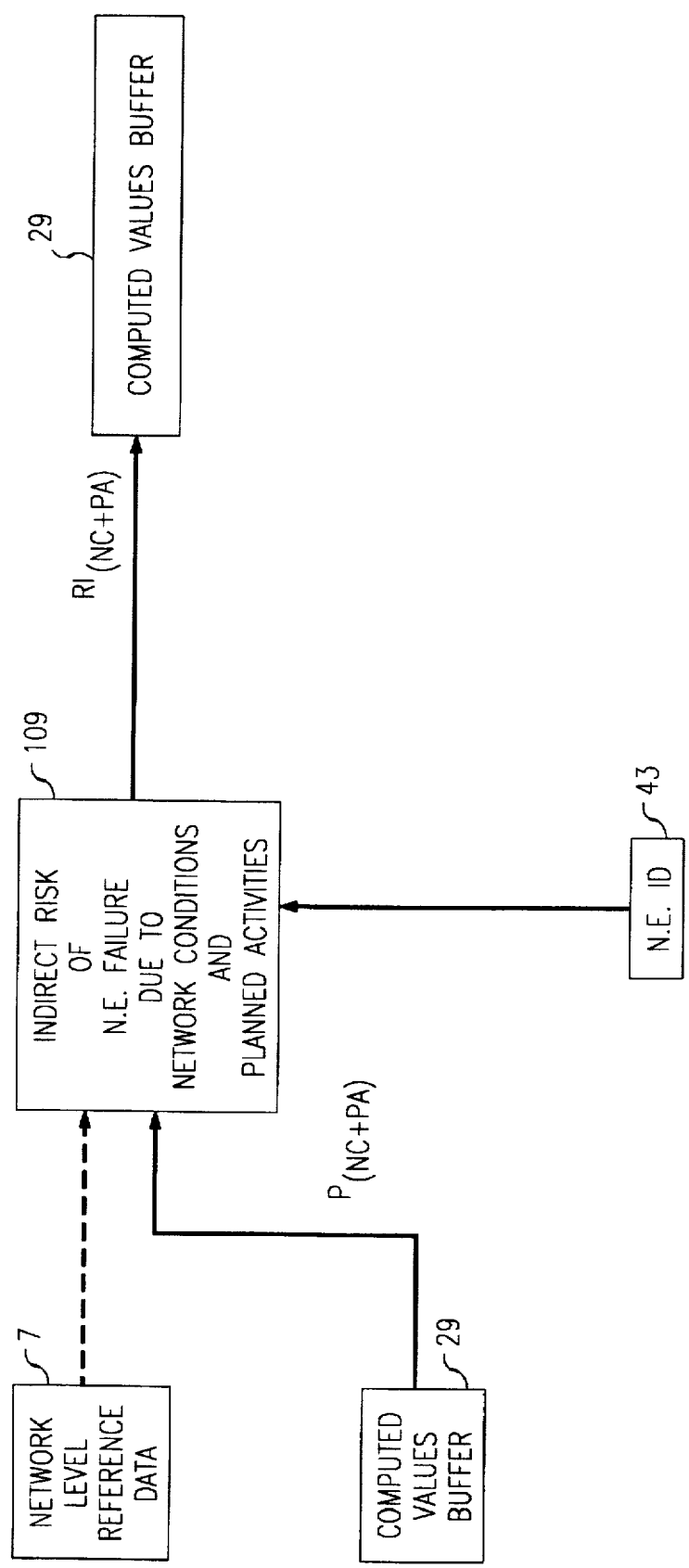

FIG. 5B illustrates the same method of computing indirect risk as described above except that in submodule 109 the probability values used to compute the indirect risk also include the failure probability due to planned activities $P_{(NC+PA)}$. The resultant risk value, $RI_{(NC+PA)}$, is sent to buffer 29 and used to display the result of "what if" queries by the system operator.

Figure 6A:
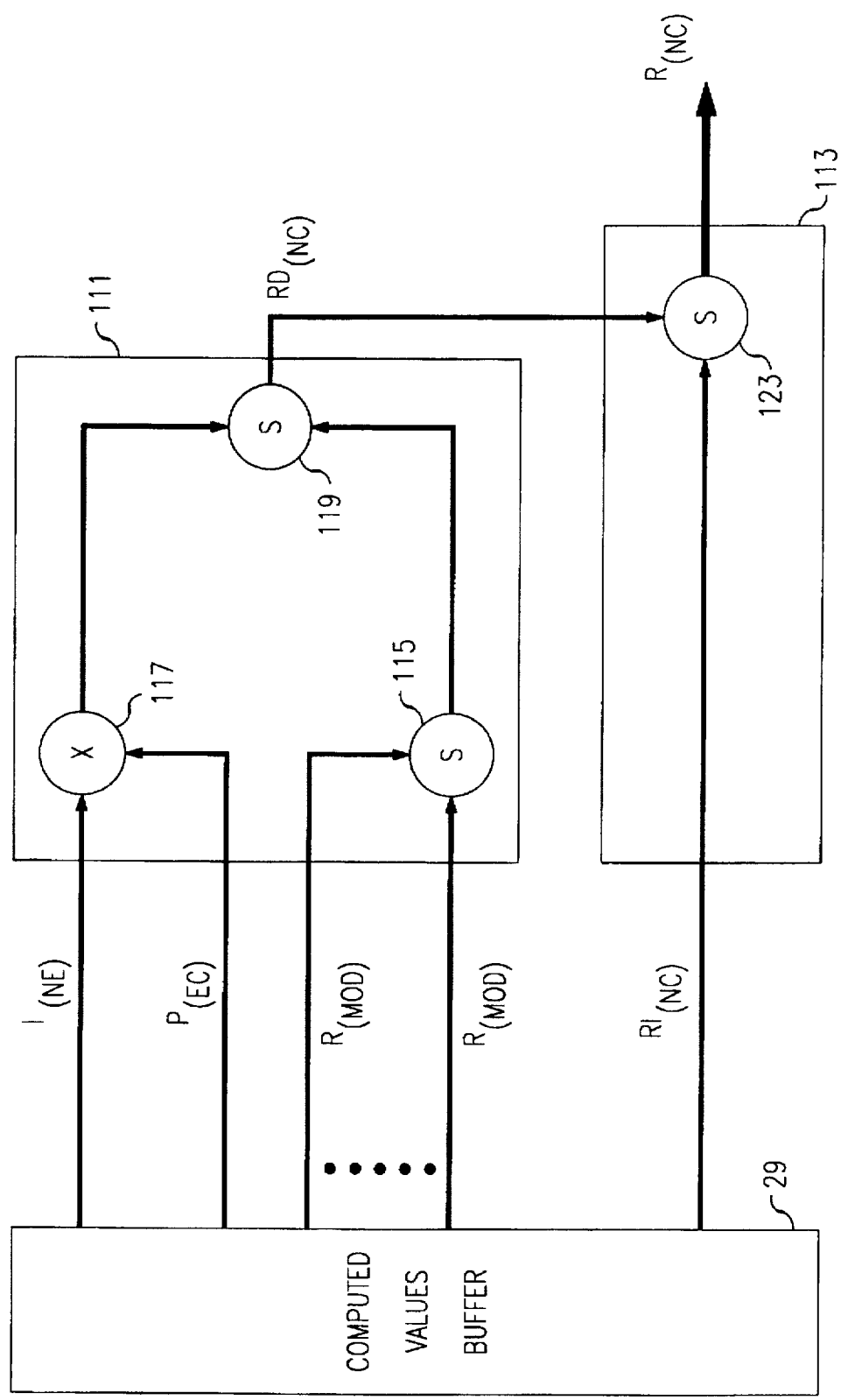
FIGS. 6A-6B are diagrams illustrating the submodules for determining the risk of network element failure due to network conditions and planned activities.

FIG. 6A illustrates the method of computing the risk of network element failure due to network conditions as implemented by module 19. Module 19 computes two risk values: the risk due to the direct impact of a network element failure, and the risk due to the combined direct and indirect impact of network element network conditions.

The risk due to the direct impact, $RD_{(NC)}$, is computed by submodule 111 as the sum of the total risk due to functional module failures in the network element ($\sigma R_{(MOD)}$) and the risk of network element failure due to external conditions. The total module risk is summed at summer 115. The risk of network element failure due to external conditions is the product of the failure probability due to external conditions $P_{(EC)}$ and the impact of network element failure $I_{(NE)}$, computed at multiplier 117. Summer 119 then computes the risk due to the direct impact of the network element's failure $RD_{(NC)}$. Inputs $R_{(MOD)}$, $P_{(EC)}$, and $I_{(NE)}$ are received from buffer 29.

The risk due to the combined impact of network conditions $R_{(NC)}$ takes into account the risk due to direct impact of network element failure and the indirect risk. It is computed by submodule 113 as the sum of the direct risk value $RD_{(NC)}$ described above and the indirect risk $RI_{(NC)}$ due to the indirect impact of the network element failure which takes into account the increased likelihood of a complete sub-network failure. Summer 123 adds $RD_{(NC)}$ to the indirect risk $RI_{(NC)}$ and then outputs $R_{(NC)}$ directly to the interface module 25 for display to the user 27. The input $RI_{(NC)}$ is received from buffer 29.

Figure 6B:
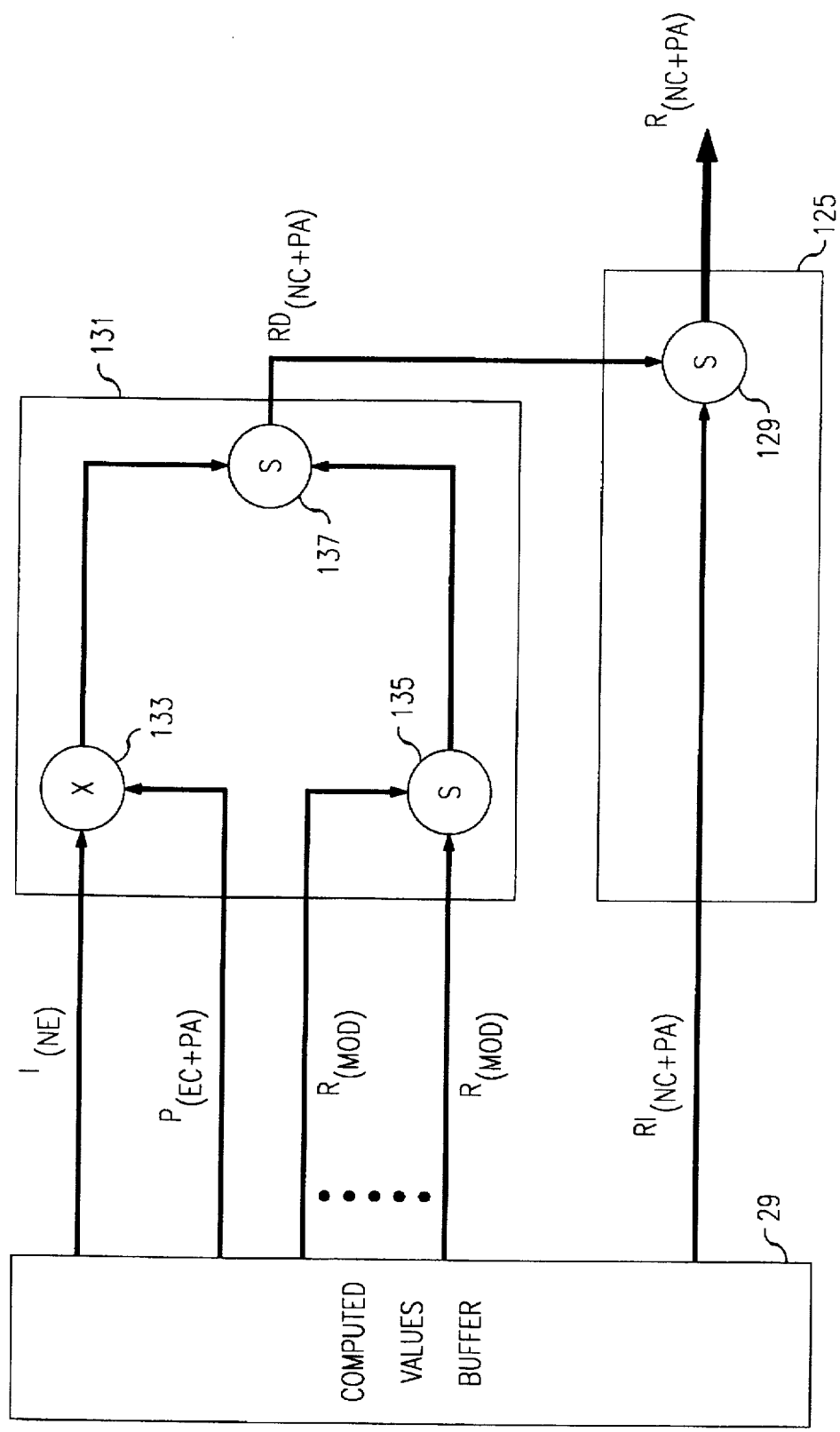

FIG. 6B illustrates the same method of computing risk as described above except that the probability of failure due to planned activities is also considered in addition to the probabilities due to actual network conditions. Multiplier 133 of submodule 131 multiplies $I_{(NE)}$ by $P_{(EC+PA)}$. Summer 135 computes $\sigma R_{(MOD)}$. Summer 137 adds this value to the output of multiplier 133 to compute $RD_{(NC+PA)}$. Summer 129 adds $RI_{(NC+PA)}$ to $RD_{(NC+PA)}$, and thereby derives the risk due to direct and indirect impact but also accounting for planned activities $R_{(NC+PA)}$.

Figure 7:
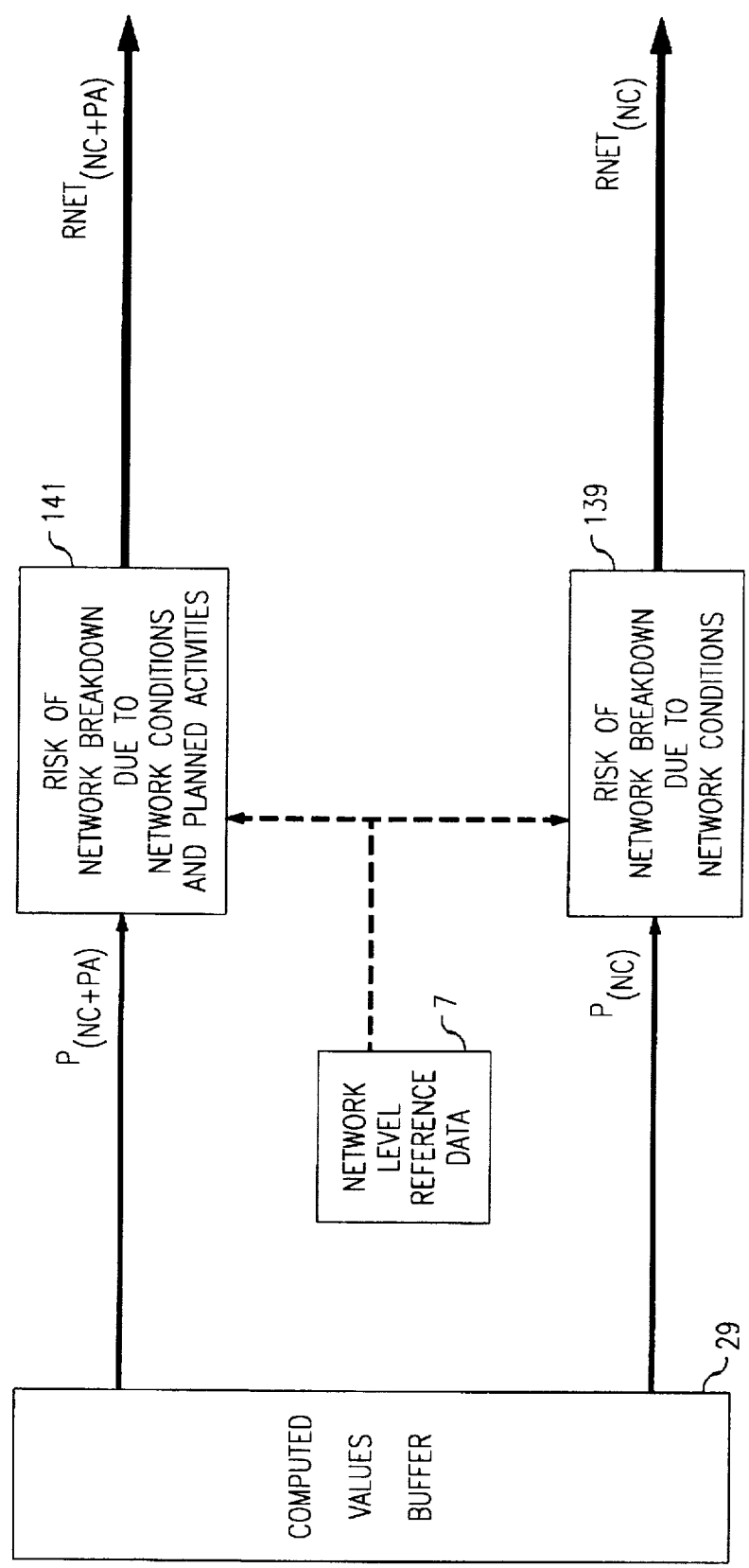
FIG. 7 is a diagram illustrating the submodules for determining network risks due to network conditions and planned activities.

FIG. 7 illustrates the method of computing total network level risk as implemented by module 17. Submodule 139 computes the risks of network breakdown due to network conditions $RNET_{(NC)}$ as follows: For each sub-network compute the total sub-network failure probability by plugging the value $P_{(NC)}$, received from buffer 29, into the corresponding cut-set(s) definition(s) received from data module 7. Multiply the resulting value by the sub-network's impact value received from data module 7. This product is the risk of sub-network failure. These risks $RNET_{(NC)}$ are sent to interface module 25 for display to users 27.

Submodule 141 computes the risks of network breakdown due to network conditions and planned activities $RNET_{(NC+PA)}$. The computations performed by this submodule are the same as those described for submodule 139, except that the input probabilities $P_{(NC+PA)}$ also take into account the effect of planned activities. These computed risks $RNET_{(NC+PA)}$ are also sent to interface module 25 for display.

The present invention as described has a number of applications including maintenance management, network management, and traffic management. For example, the invention enables persons responsible for managing maintenance activities to identify the risk of an abnormal condition based on the combination of alarm severity (which is defined only from the network element's perspective) and its impact on the network. It also provides an objective criterion for setting repair priorities for concurrent abnormal conditions.

The present invention also enables persons responsible for maintaining the integrity of the overall network to quantitatively assess the vulnerability of each major sub-network, and to identify the network elements whose failure, when other redundant components are already unavailable or at risk, would lead to a complete network failure. Those persons can also quantitatively assess the risk of planned activities, and of their impact on the overall risk level of the network. This objective assessment can be used to provide the go-ahead for the initiation of those planned activities.

Furthermore, the present invention allows persons responsible for the surveillance of traffic patterns within the network to take into account the risk of failure of the network elements involved in alternate traffic routes. The risk associated with a high rate of call irregularities in network elements may also be assessed. These call irregularities indicate potential abnormal conditions that may not otherwise be observed.

In this disclosure, there is shown and described the preferred embodiment of the invention, it being understood that the invention is capable of use in various combinations and environments. Furthermore, the present invention is capable of changes or modifications within the scope of the inventive concepts as expressed herein.

I claim:

1. A method for identifying risks associated with abnormal conditions of network elements communications network, comprising the steps of:

collecting alarm message signals from a communications network;

electronically processing said alarm message signals to generate abnormal condition signals;

receiving external condition signals indicative of external conditions affecting network elements in said communications network;

generating direct and indirect risk signals based upon said abnormal condition signals, said external condition signals, and stored reference data;

summing said direct and indirect risk signals to generate a network element risk signal;

displaying said network element risk signal to aid in assessing risks associated with network elements experiencing abnormal conditions.

2. The method of claim 1, wherein said step of generating a direct risk signal includes the substeps:

computing a total module failure risk by summing module failure risks for a given network element; and adding said total module failure risk to said given network element's risk due to external conditions.

3. The method of claim 2, wherein said module failure risks are computed by the substeps comprising:

retrieving from memory, based upon said abnormal condition signals, first probability data indicative of the failure probability of a functional module of said given network element, second probability data indicative of the failure probability of said functional module's mate, network element impact data, and a module impact factor;

retrieving from memory, based upon said external condition signals, probability multiplier data;

computing a module failure probability signal as the product of said first probability data, said second probability data, and said probability multiplier data;

computing said module failure risk as the product of said module failure probability signal, said network element impact data, and said module impact factor.

4. The method of claim 3, wherein said probability multiplier data includes a traffic congestion factor and a module maturity factor.

5. The method of claim 2, wherein said network element's risk due to external conditions is computed by the substeps comprising:

retrieving from memory, based upon said abnormal condition signals, network element impact data;

retrieving from memory, based upon said external condition signals, third probability data indicative of the failure probability of said given network element due to external conditions;

computing said risk due to external conditions as the product of said network element impact data and said failure probability due to external conditions.

6. The method of claim 5, wherein said external conditions include utility power alerts, weather alerts and on-going maintenance.

7. The method of claim 1, wherein said step of generating an indirect risk signal includes the substeps:

retrieving from memory, based upon said abnormal condition signals, background failure probability data, network impact data and cut-set data associated with a given network element;

computing a first cut-set value from prevailing failure probabilities of all constituent network elements identified by said cut-set data;

computing a second cut-set value from said prevailing failure probabilities of all constituent network elements identified by said cut-set data, except using said background probability data for the probability of said given network element;

computing said indirect risk signal as the product of said network impact data and the difference of said first and second cut-set values.

8. The method of claim 7, wherein said prevailing failure probabilities are computed by the substeps comprising:

summing module failure probabilities, associated with said given network element, where said module failures would result in the complete failure of said given network element; and computing said prevailing failure probability of said given network element by adding said summed module failure probabilities to third probability data indicative of the failure probability of said given network element due to external conditions.

9. The method of claim 1, wherein said generation of direct and indirect risk signals account for planned maintenance activity.

10. The method of claim 1, further comprising the steps:

retrieving from memory, based upon said abnormal condition signals, cut-set data and impact data associated with a sub-network;

computing a cut-set value from prevailing failure probabilities of all constituent network elements identified by said cut-set data;

computing a sub-network risk signal as the product of said cut-set value and said sub-network impact data;

displaying said sub-network risk signal to aid in assessing overall risk of said communications network.

11. An apparatus for identifying risks associated with abnormal conditions of network elements in a communications network comprising:

a data collection and processing module that collects alarm message signals from a communications network and processes said alarm messages to generate abnormal condition signals;

an interface module that receives external condition signals indicative of external conditions affecting network elements in said communications network;

an electronic risk processing module that generates direct and indirect risk signals based upon said abnormal condition signals, said external condition signals, and stored reference data; and a display means that displays a network element risk signal to aid in assessing risks associated with network elements experiencing abnormal conditions, where said network element risk signal is the sum of said direct and indirect risk signals.

12. The apparatus of claim 11, wherein said electronic risk processing module determines said direct risk signal based on network element risks due to functional modules experiencing said abnormal conditions, and based on network element risks due to external condition.

13. The apparatus of claim 12, wherein said external conditions include weather alerts and utility power alerts.

14. The apparatus of claim 12, where said external conditions further include on-going maintenance.

15. The apparatus of claim 11, wherein said network element risks due to functional modules experiencing said abnormal conditions account for the effects due to hardware and software maturity by way of a probability multiplier.

16. The apparatus of claim 11, wherein said network element risks due to functional modules experiencing said abnormal conditions account for the effects due to traffic congestion by way of a probability multiplier.

17. The apparatus of claim 11, wherein said electronic risk processing module determines said indirect risk signal based on cut-sets and impact data associated with sub-networks of said communications network.

18. The apparatus of claim 17, wherein said indirect risk signal represents the contribution to sub-network risk due to an abnormal condition of a given network element within said cut-sets.

19. The apparatus of claim 11, wherein said electronic risk processing module accounts for planned maintenance activities when determining direct and indirect risks.

20. The apparatus of claim 11, wherein said electronic risk processing module further generates a sub-network risk signal based on cut-sets and impact data associated with a sub-network of said communications network; and where said display means displays said sub-network risk signal to aid in assessing overall risk of said communications network.

21. An apparatus for identifying the risks associated with abnormal conditions of network elements in a communications network, comprising:

a data collection and processing module that collects alarm message signals from a communications network and processes said alarm messages to generate abnormal condition signals;

an interface module that receives external condition signals indicative of external conditions affecting network elements in said communications network;

an electronic risk processing module that generates a direct risk signal including the effects of functional module risk and external condition risk; and a display means that displays a network element risk signal to aid in assessing risks associated with network elements experiencing abnormal conditions;

wherein said functional module risk is derived from the probability of simplex failure of a functional module, the probability of mate failure, and a probability multiplier; and wherein said network element risk signal includes the risk represented by said direct risk signal.

22. The apparatus of claim 21, wherein said probability multiplier accounts for the effects of traffic congestion.

23. The apparatus of claim 21, wherein said probability multiplier accounts for the effects of hardware and/or software maturity.

24. The apparatus of claim 21, wherein said network element risk signal is the sum of said direct risk signal and an indirect risk signal.

25. The apparatus of claim 24, wherein said indirect risk signal represents the contribution to sub-network risk due to an abnormal condition of a given network element associated with a cut-set of said sub-network.

26. The apparatus of claim 21, wherein said electronic risk processing module further generates a sub-network risk signal based on cut-sets and impact data associated with a sub-network of said communications network; and where said display means displays said sub-network risk signal to aid in assessing overall risk of said communications network.

* * * * *